(12) United States Patent
Kobayashi (10) Patent No.: US 6,568,747 B2
(45) Date of Patent: May 27, 2003

(54) AUTOMOTIVE FLOOR STRUCTURE (75) Inventor: Masato Kobayashi, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/791,567

(22) Filed: Feb. 26, 2001

(65) Prior Publication Data

US 2001/0019216 A1 Sep. 6, 2001

(30) Foreign Application Priority Data

Mar. 2, 2000 (JP) ........................................ 2000-057302

(51) Int. Cl.⁷ ............................................... B60R 27/00
(52) U.S. Cl. ............. 296/204; 296/203.04; 296/203.03; 296/209
(58) Field of Search ................................ 296/188, 189, 296/209, 204, 203.04, 203.03

(56) References Cited

U.S. PATENT DOCUMENTS

| 5,242,209 A | * | 9/1993 | Yamauchi | 296/188 |
| 5,577,797 A | | 11/1996 | Takanishi | 296/203 |
| 5,782,525 A | * | 7/1998 | Honma et al. | 296/188 |
| 5,984,402 A | | 11/1999 | Takeuchi | 296/188 |

FOREIGN PATENT DOCUMENTS

| DE | 4335501 A1 | 4/1995 |
| EP | 0937631 A2 | 8/1999 |
| JP | 7-165124 | 6/1995 |
| JP | 09099870 | 4/1997 |

OTHER PUBLICATIONS

European Search Report dated Jun. 1, 2001.

\* cited by examiner

*Primary Examiner*—D. Glenn Dayoan
*Assistant Examiner*—H. Gutman
(74) *Attorney, Agent, or Firm*—McDermott, Will & Emery (57) ABSTRACT

An improvement on a vehicle floor structure is provided which includes joint members each of which has a closed hollow structure and joins a rear extension of one of side sills, one end of a rear seat cross member, and a front end of one of the rear side members. Each of the joint members is installed between one end of the rear seat cross member and one of the side sills and has a lower-rigidity region formed adjacent the end of the rear seat cross member for facilitating ease of a lateral collapse of a vehicle body in the lower-rigidity region upon occurrence of a side collision of the vehicle.

24 Claims, 11 Drawing Sheets

AUTOMOTIVE FLOOR STRUCTURE

BACKGROUND OF THE INVENTION

1. Technical Field

The present invention relates generally to an improvement on a floor structure of automotive vehicles, and more particularly to a joint structure for joining side sills extending longitudinally of a vehicle body on both sides of a front floor, a rear seat cross member installed on a rear floor connected to the rear of the front floor, and rear side members extending longitudinally of the vehicle body on both sides of the rear floor.

2. Background Art

Japanese Patent First Publication No. 7-165124 teaches a joint structure for floor frame members of an automotive vehicle. In the joint structure, a front end portion of each rear side member is connected along an inner side surface of a rear end portion of one of the side sills. Each end of a rear seat cross member extending in a width-wise direction of a vehicle body passes through one of the rear side members perpendicular thereto and connects with the inner side surface of one of the side sills, thereby strengthening a connection of three types of these floor frame members to increase the rigidity of a rear portion of a vehicle cabin for reducing undesirable mechanical vibrations.

In recent years, there has been proposed molding techniques for extruding a lightweight metal such as aluminum alloy in a longitudinal direction of a vehicle body to form a front floor having a closed hollow structure for decreasing the weight while increasing the rigidity of the vehicle body.

Using the extruded front floor increases an impact energy absorption and maintains a cabin space for a passenger by decreasing a lateral deformation of the front floor, since the front floor is extruded in a longitudinal direction and the impact from a center pillar studded on a side sill is perpendicular to each other, so the buckling deformation from the impact is distributed to a wide range of the floor by longitudinal stiffeners of the floor.

To attain this impact distribution ideally, a base portion of the center pillar lower end rotates into the cabin pivoted center pillar upper end, while maintaining its inner surface substantially parallel to a longitudinal body line. But the suggested three structure member gathering high strength structure which is fixed each other (the side sill, the rear sheet cross member and the rear side member) has a possibility to prevents deformation of the side sill or the front floor rear part and may prevent an ideal buckling deformation mode of the floor.

To attain this ideal impact distribution, a base portion of the center pillar lower end rotates into the cabin as it is pivoted about the center pillar upper end, while maintaining its inner surface substantially parallel to a longitudinal body line. But the suggested three structure member gathering high strength structure which is fixed each other (the side sill, the rear sheet cross member and the rear side member) may prevent deformation of the side sill or the front floor rear part and may prevent an ideal buckling deformation mode of the floor.

SUMMARY OF THE INVENTION

It is therefore a principal object of the present invention to improve the prior art.

It is another object of the present invention to provide a floor structure for an automotive vehicle which is designed to increase an absorbed amount of energy of impact acting on a vehicle body upon occurrence of a side collision without sacrificing the volume of a cabin for vehicle occupants and producing a buckling deformation mode of the floor.

According to one aspect of the invention, there is provided a vehicle floor which comprises (a) a front floor formed in extrusion, the front floor being so oriented that a direction of the extrusion is in parallel to a longitudinal direction of a vehicle; (b) a rear floor joined to a rear end of the front floor; (c) side sills disposed on sides of the front floor, each of the side sills extending in the longitudinal direction of the vehicle and having an extension projecting backward from the front floor; (d) a rear seat cross member having a length extending in a width-wise direction of the vehicle, the rear seat cross member being disposed on a connection of the rear floor to the front floor extending in the width-wise direction of the vehicle; (e) rear side members disposed on sides of the rear floor, extending in the longitudinal direction of the vehicle; (f) pillars secured on the side sills above the rear seat cross member; and (g) joint members each of which has a closed hollow structure and joins the extension of one of the side sills, one end of the rear seat cross member, and a front end of one of the rear side members, each of the joint members being installed between one end of the rear seat cross member and one of the side sills and having a lower-rigidity region formed adjacent the end of the rear seat cross member in the width-wise direction of the vehicle.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
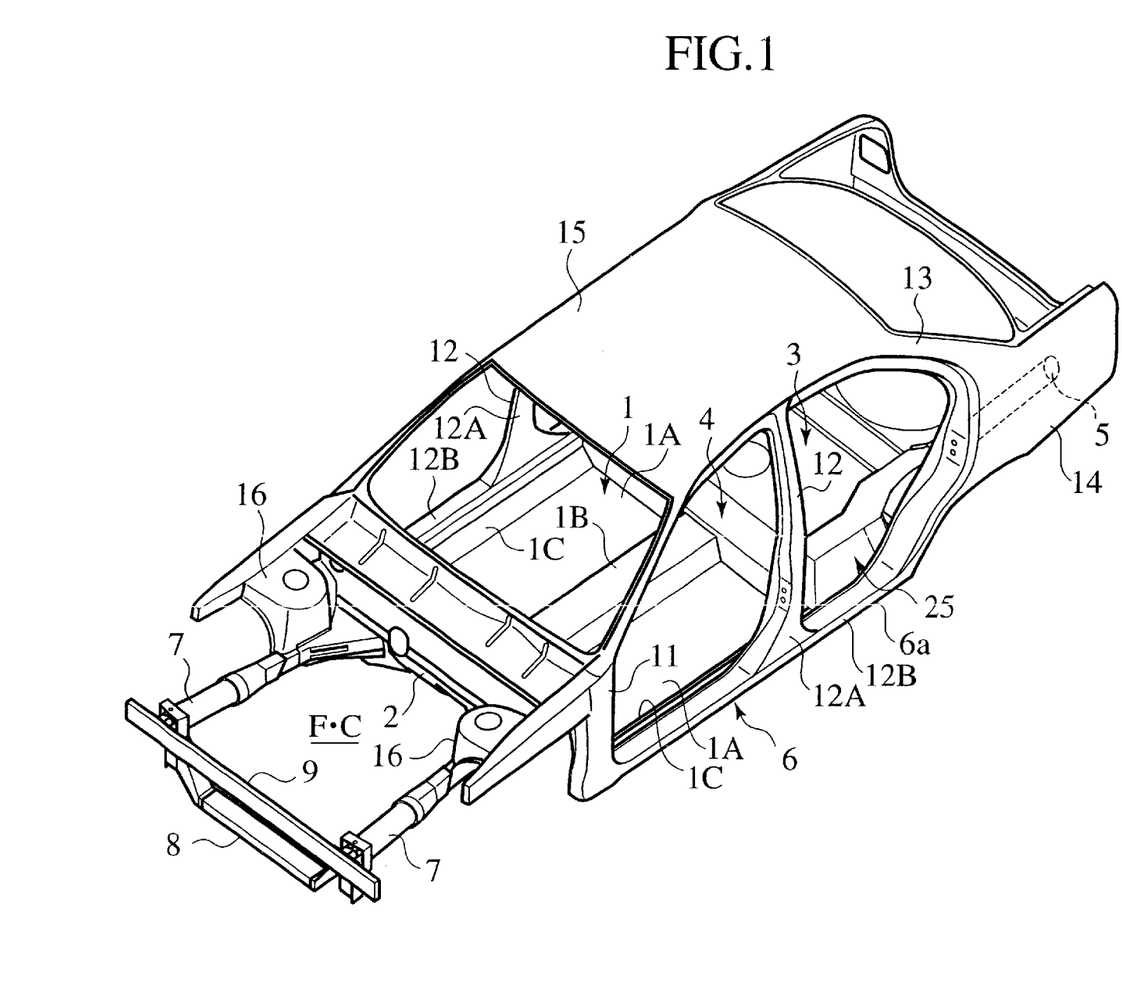
FIG. 1 is a perspective view which shows a vehicle body having a floor structure according to the preset invention.

Referring now to the drawings, wherein like numbers refer to like parts in several views, particularly to FIG. 1, there is shown a floor structure of an automotive vehicle according to the invention.

The floor of the vehicle, as described below, has a mirror-image structure about the longitudinal center line of a vehicle body, and the following discussion will refer basically only to the left side of the floor for the sake of simplicity of disclosure.

The floor of the vehicle includes a front floor 1 and a rear floor 3. The front floor 1 connects at a front end thereof to a dash cross member 2. The rear floor 3 connects with a rear end of the front floor 1. Rear side members 5 (only one is shown for the brevity of illustration) are installed on ends of the rear floor 3 and extend in the longitudinal direction of the vehicle body. A rear seat cross member 4 is disposed on a connection of the rear floor 3 with the front floor 1 extending in a width-wise direction of the vehicle. Side sills 6 (only one is shown for the brevity of illustration) are disposed on right and left sides of the front floor 1 and extend in a longitudinal direction of the vehicle over the rear end of the front floor 1.

Figure 2:
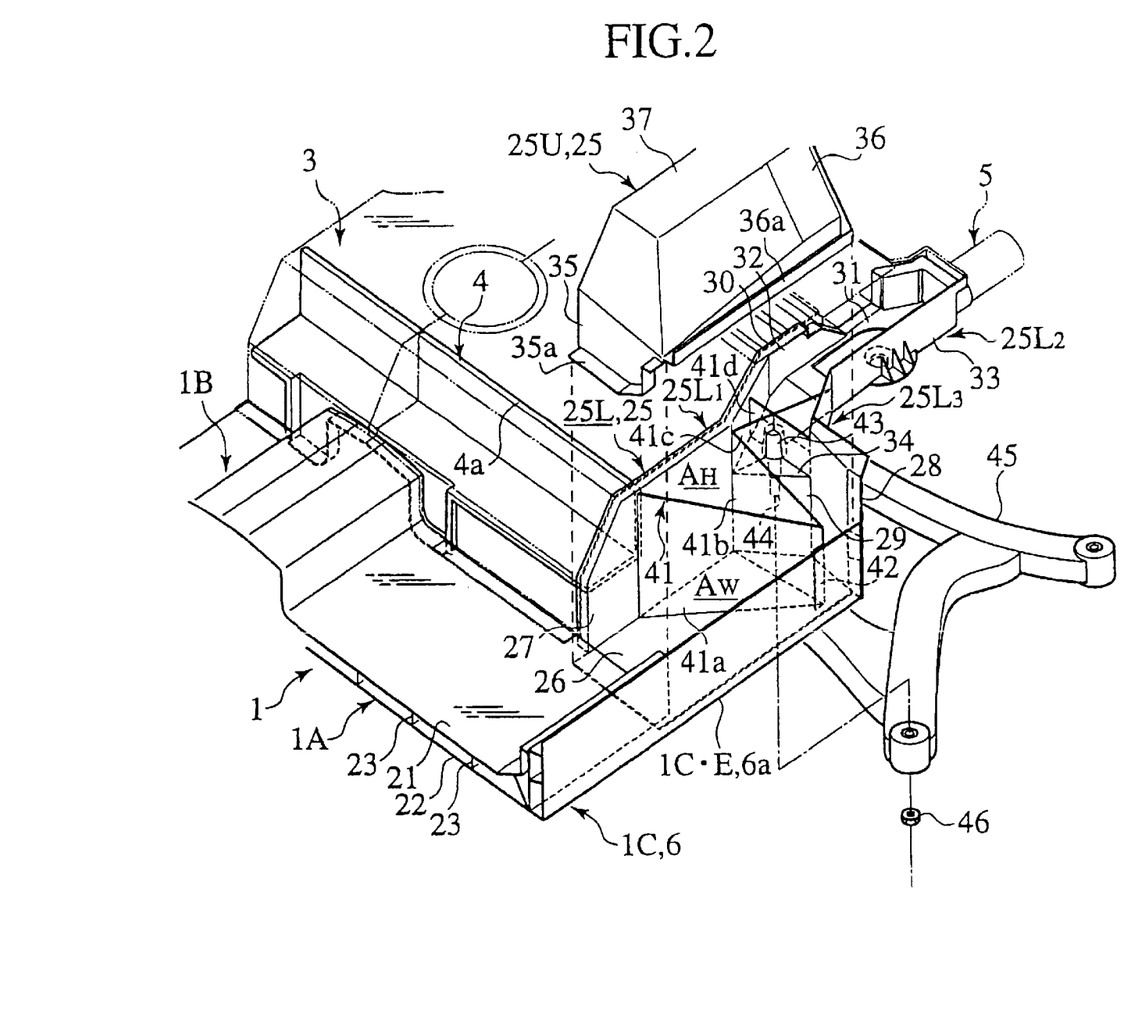
FIG. 2 is a partial perspective and exploded view which shows a vehicle body structure cording to the present invention.

The rear seat cross member 4, as clearly shown in FIG. 2, has a substantially L-shaped cross section and connects through a flange 4a formed on an upper edge thereof with a portion of the rear floor 3 on a rear side of a front end which is bent downward, thereby forming a closed hollow frame member extending in the width-wise direction of the vehicle. Each of the rear side members 5 is cylindrical and serves as one of longitudinal frame members. Each of the side sills 6 is made of a closed hollow member and serves as one of the longitudinal frame members.

Referring back to FIG. 1, right and left front side members 7 are joined to front side portions of the dash cross member 2. The front side members 7 extend longitudinally of the vehicle and connect at front ends thereof with a first cross member 8 and a bumper armature 9. The front side members 7, the first cross member 8, and the bumper armature 9 form a framework of a front compartment F.C.

The vehicle body also includes front pillars 11, center pillars 12, rear pillars 13, rear fenders 14, a roof panel 15, and strut housings 16 serving as main frame members of the front compartment F.C.

Figure 3:
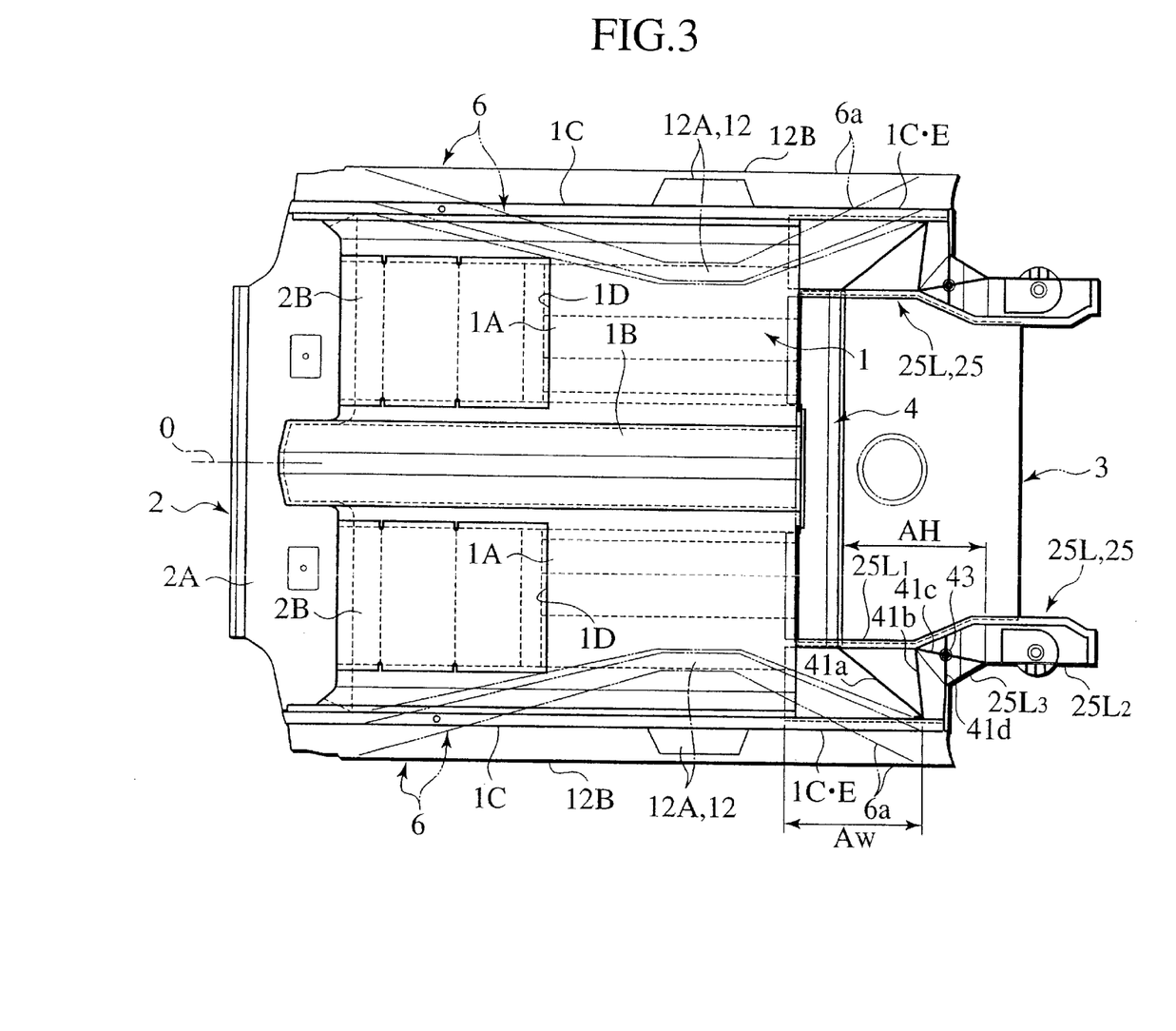
FIG. 3 is a plan view which show a floor structure of the first embodiment.
Figure 4:
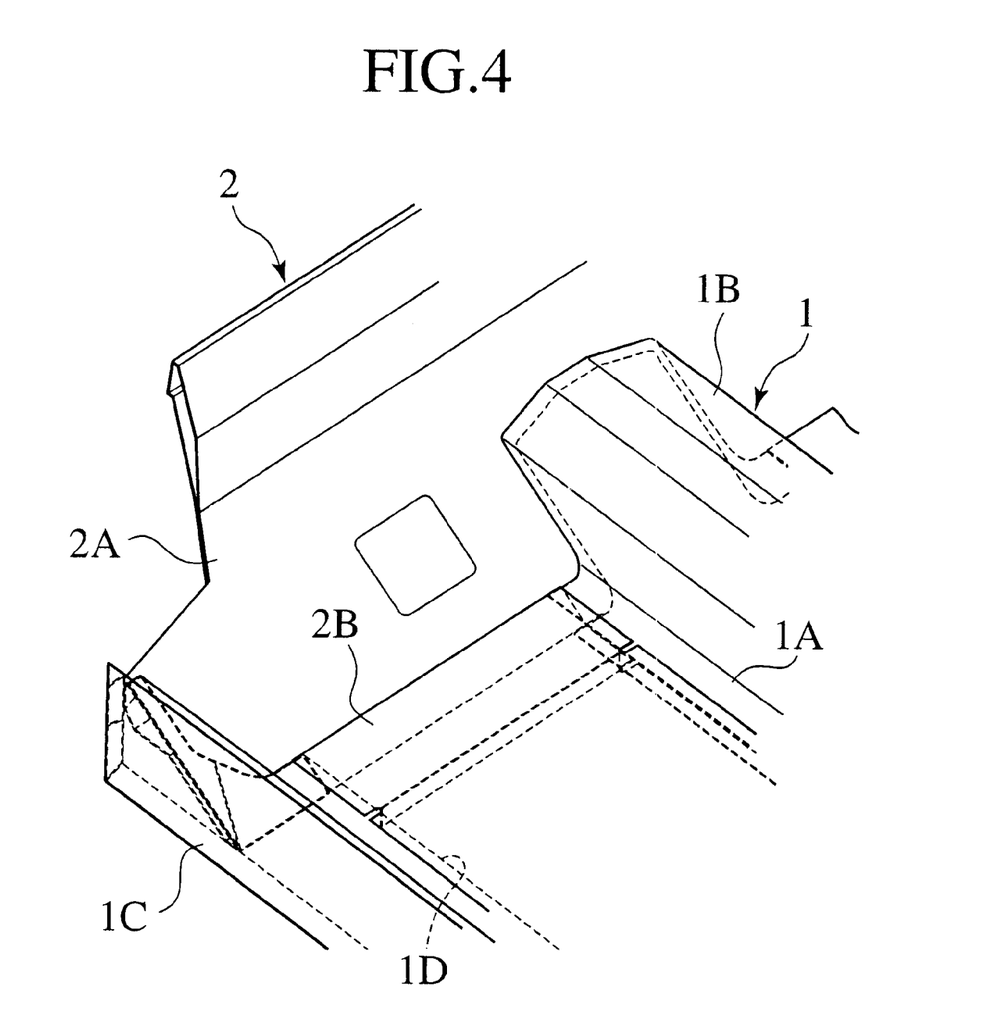
FIG. 4 is a partial perspective view which shows a connection of a dash cross member and a front floor.
Figure 5:
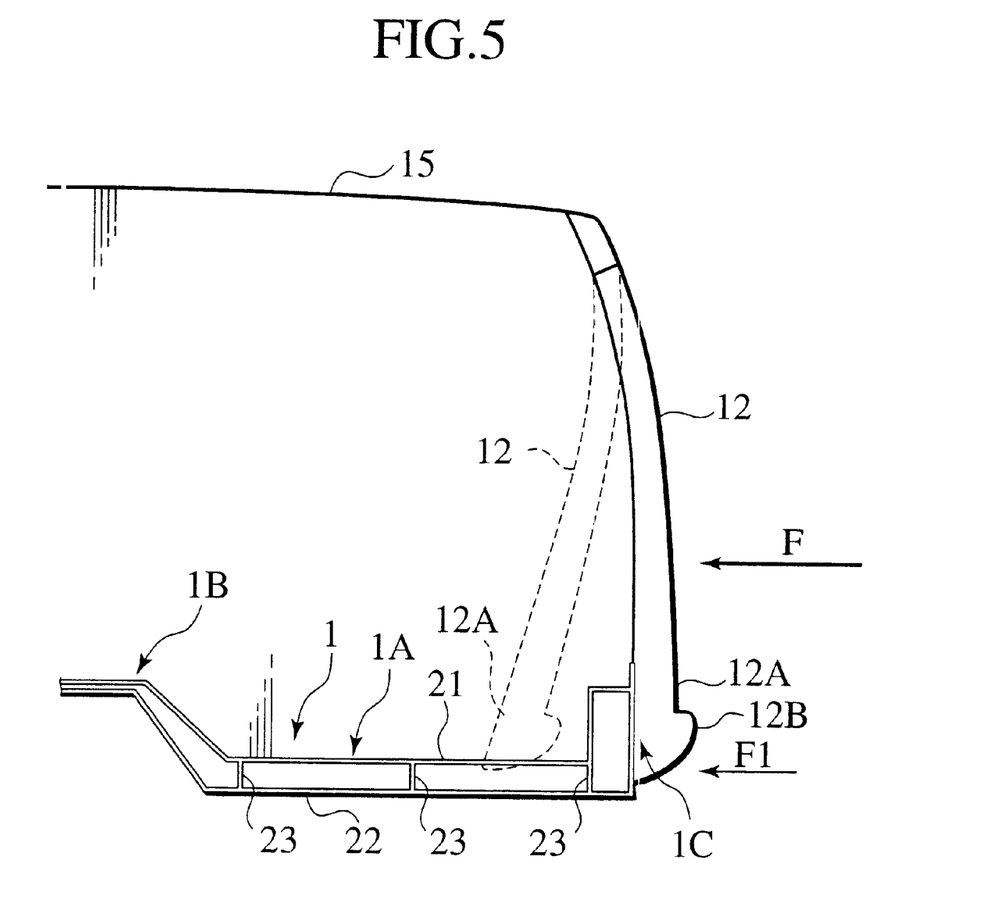
FIG. 5 is a partial sectional view which shows deformation of a center pillar upon occurrence of a side collision of a vehicle.

The front floor 1 includes, as shown in FIGS. 1 to 5, flat pans 1A, a center tunnel 1B extending longitudinally of the vehicle between the flat pans 1A, and side sill portions 1C. The front floor 1 of this embodiment is formed by extruding a lightweight metal such as aluminum alloy to have a hollow structure, as shown in FIGS. 2 and 5, in which a plurality of ribs 23 extending longitudinally of the vehicle are disposed between inner and outer walls 21 and 22.

Each of the center pillars 12 is, as clearly shown in FIG. 1, disposed closer to the front of the vehicle than the rear seat cross member 4 and connects at a lower base 12A thereof integrally with one of sill outers 12B extending in the longitudinal direction of the vehicle. The sill outers 12B are welded to outer side surfaces of the side sill portions 1C to form the side sills 6, respectively. Specifically, the side sills 6 each have a double closed hollow structure in the width-wise direction of the vehicle together with the side sill portion 1C and the sill outer 13B.

Cut-away portions 1D are formed in front portions of the flat pans 1A of the front floor 1 which range from the tunnel 1B to the side sill portions 1C. The dash cross member 2 is formed by extruding the same lightweight metal as that of the front floor 1 in the width-wise direction of the vehicle to have a closed hollow structure. The dash cross member 2 has a toe board 2A formed integrally. The toe board 2A has flat joint portions 2B extending backward from a lower edge of an inclined portion thereof. The flat joint portions 2B have a closed hollow structure and are welded in the cut-away portions 1D to form flat floor surfaces flush with the flat floor pans 1A.

Each of the side sill portions 1C is, as clearly shown in FIG. 4, welded at a front edge thereof to one of sides of the toe board 2A of the dash cross member 2.

The reference number 25 denotes jointing means which can include joint members (a left one is shown for the brevity of illustration) each of which joins a rear extension 6a of one of the side sills 6, one end of the rear seat cross member 4, and the front end of one of the rear side members 5. The joint member 25 has a closed hollow structure and is made up of a lower member 25L and an upper member 25U which are made of the same lightweight metal as that of the front floor 1.

The lower member 25L is made up of a member body 25L1, an arm 25L2, and an arm base 25L3. The member body 25L1 is disposed between the end of the rear seat cross member 4 and the rear extension 6a of the side sill 6, or an extension 1C·E of the side sill portion 1C. The arm 25L2 is disposed inside the member body 25L1 and connects with the front end of the rear side member 5 substantially in alignment with the front portion of the rear side member 5. The arm base 25L3 extends in the width-wise direction of the vehicle from the front end of the arm 25L2 to connect the arm 25L2 to the member body 25L1.

The member body 25L1 consists of a bottom wall 26, an inner side wall 27, a rear wall 28, and a corner wall 29. The corner wall 29 is oriented substantially perpendicular to the arm base 25L3 and connects the side wall 27 and the rear wall 28.

The arm 25L2 and the arm base 25L3 are connected together and formed by a bottom wall 31, an inner side wall 32, and an outer side wall 33. The bottom wall 31 extends from an upper edge of the corner wall 29 of the member body 25L1. The inner side wall 32 extends from the side wall 27 of the member body 25L1. The outer side wall 33 extends from the rear wall 28 of the member body 25L1.

A portion of the bottom wall 31 of the arm base 25L3 connecting with the upper edge of the corner wall 29 forms a flat shelf 34.

The bottom wall 26 of the member body 25L1 connects with a lower surface of the rear end of the flat pan 1A of the front floor 1 and a lower surface of the extension 1C·E of the side sill portion 1C. The rear wall 28 connects directly with the rear end of the extension 1C·E of the side sill portion 1C.

A flange 30 is formed over the upper edge of the inner side wall 27 of the member body 25L1 and the upper edge of the inner side wall 32 of the arm 25L2 to connect the side walls 27 and 32 to a side edge of the rear floor 3. The rear seat cross member 4 is connected at each end thereof to the inner side wall 27 through the flange 4a. With this arrangement, the lower member 25L is connected to the extension 1C·E of the side sill portion 1C, the rear seat cross member 4, and the rear side member 5.

The upper member 25U is formed by a front wall 35, an outer side wall 36 and an upper wall 37 and installed on the lower member 25L. The upper wall 37 covers an area ranging from the member body 25L1 of the lower member 25L to the arm 25L2 and has a constant width extending longitudinally from an inside side edge.

The front wall 35 has an upper half which is angled backward to be contoured to the front end of the rear floor 3 and connected to an end of the upper wall 37. The side wall 36 is inclined slightly inward of the vehicle body from the upper edge of the rear extension 1C·E of the side sill portion 1C to the side edge of the upper wall 37.

The upper member 25U is fitted on the lower member 25L coupled to the three floor frame members 4 and 5 and to the sill 6. Specifically, the upper member 25U has a flange 35a formed on a lower edge of the front wall 35 joined to the rear end upper surface of the floor pan 1A and a flange 36a formed on a lower edge of the side wall 36 secured to the upper edge of the rear extension 1C·E of the side sill portion 1C to connect an inside side edge and a rear edge of the upper wall 37 to a side edge of the rear floor 3 and a rear end of the arm 25L2 of the lower member 25L, respectively. The upper member 25U also has a flange 36a formed over an outside side edge of the upper wall 37 and the rear end of the side wall 36. The flange 36a is joined to the outer side wall 33 extending from the arm 25L2 of the lower member 25L to the arm base 25L3 and the rear wall 28 of the member body 25L1 to define a closed hollow structure.

A lower-rigidity region $A_W$ is defined in the inside of the joint member 25, which faces the end of the rear seat cross member 4. The term lower-rigidity region $A_W$ is a relative term expressing the relation to the rigidity of region $A_W$ with respect to adjacent regions and relates to a static rigidity (i.e., load or impact bearing rigidity) as opposed to dynamic rigidity (i.e., a vibratory rigidity). In one aspect of the invention, an upstanding rib 41 is installed backward from a connection of the joint member 25 to the end of the rear seat cross member 4 to form a higher-rigidity region $A_H$ offset backward from the end of the rear seat cross member 4, thereby defining the lower-rigidity region $A_W$ in the joint member 25 adjacent the end of the rear seat cross member 4. Similar to the above, the term higher-rigidity region $A_H$ is a relative term expressing the relation to the rigidity of region $A_H$ with respect to adjacent regions and relates to a static rigidity.

The rib 41 has a height close to or in contact with the upper member 25U to define a plurality of closed chambers in the higher-rigidity region AH.

The rib 41 is made up of a first rib 41a, a second rib 41b, a third rib 41c, and a fourth rib 41d which are connection integrally at ends thereof. The first rib 41a is disposed on the bottom wall 26 of the member body 25L1 and connected at one end thereof to a portion of the side wall 27 joined to a rear edge of the end of the rear seat cross member 4 and at the other end to a rear edge to a rear side surface of the rear extension 1C·E of the side sill portion 1C. Specifically, the first rib 41a has a plane surface oriented backward from the end of the rear seat cross member 4 toward the rear end of the rear extension 1C·E and a flange 42 formed on the outer end thereof. The flange 42 is coupled to the inner side wall of rear extension 1C·E.

The second rib 41b is, like the first rib 41a, disposed on the bottom wall 26 of the member body 25L1 and extends from the inner side wall of the rear extension 1C·E to a joint of the corner wall 29 and the inner side wall 27.

The third rib 41c is disposed on the bottom wall 31 and the shelf 34 of the arm base 25L3 and extends longitudinally of the vehicle body from the inside end of the second rib 41b to a joint of the arm base 25L3 and the arm 25L2 of the side wall 33.

The fourth rib 41d is disposed on the shelf 34 and extends from a joint of the side wall 33 of the arm base 25L3 and the rear wall 28 of the member body 25L1 to the side wall 32 of the arm base 25L3 so that an intersection of itself and the third rib 41c may lie substantially at the center of the she 34.

A boss 43 is formed integrally on the shelf 34 adjacent the intersection of the third and fourth ribs 41c and 41d. A stud bolt 44 is installed in a lower end of the boss 43 which projects from the bottom of the shelf 34 to serve as a sub-frame mounting member on which a sub-frame 45 is mounted using a nut 46.

With the above arrangements, three floor frame members: the rear extension 6a of the side sill 6, the end of the rear seat cross member 4, and the front end of the rear side member 5 are fixed by the joint member 25 so as to have the closed hollow structure ensuring the rigidity usually required by the floor of the vehicle body.

The front floor 1 is, as described above, so formed in the extrusion as to have the closed hollow structure and so arranged that the extrusion direction is parallel to the longitudinal direction of the vehicle body. This allows the buckling of the vehicle body in the width-wise direction thereof caused by an impact transmitted from the center pillar 12 to the side sill 6 when the vehicle is involved in a side collision to spread easily from the pillar lower base 12A and the side sill 6 in the longitudinal direction of the vehicle body.

Further, when the impact F, as shown in FIG. 5, acts on the center pillar 12 upon occurrence of the side collision of the vehicle body, and a component F1 of the impact F is transmitted to the front floor 1 through the pillar lower base 12A, the lower-rigidity region AW provided in the joint member 25 adjacent the end of the rear seat cross member 4 facilitates, as shown in FIG. 3, the buckling of the side sill 6 etc. inside the vehicle cabin. This achieves an ideal deformation mode in which the side sill 6, as shown in FIG. 3, is bent inside the vehicle body between the front end of the side sill 6 connected to the dash cross member 2 and the rear end of the side sill 6 coupled to the joint member 25 backward of the rear seat cross member 4 so that the pillar lower base 12A is turned, as shown in FIGS. 3 and 5, inside the cabin about the upper end thereof substantially parallel to the longitudinal center line O, thereby facilitating a lateral collapse of the front floor 1 over a wide range in the longitudinal direction of the vehicle body. This results in an increase in absorbed amount of energy of the impact and accordingly avoids a greater local collapse of the front floor 1 in the width-wise direction of the vehicle body and therefore reduces a degree of entry of the upper end of center pillar 12 into the cabin, thereby substantially preserving the space of the cabin in the width-wise direction of the vehicle body.

The lower-rigidity region AW facing the end of the rear seat cross member 4 is, as described above, provided by defining the higher-rigidity region AH in the inside of the joint member 25 offset from the end of the rear seat cross member 4 in the longitudinal direction of the vehicle body. The rigidity of the joint of the side sill 6 and the rear side member 5 is, thus, increased by the higher-rigidity region AH, thereby providing a higher resistance to the rear end of the extension 6a of the side sill 6 against the impact F acting on the pillar base 12A upon occurrence of the side collision of the vehicle body, facilitating a lateral collapse of the vehicle body in the lower-rigidity region AW.

The first rib 41a disposed at the front of the rib 41 extends, as described above, at a given angle to the longitudinal center line of the vehicle body from the end of the rear seat cross member 4 to the rear end of the rear extension 1C·E of the side sill portion 1C, thereby increasing an outside area of the lower-rigidity region AW to facilitate the ease of the lateral collapse of the vehicle body into the lower-rigidity region AW.

The higher-rigidity region AH is formed by the rib 41 made up of the first, second, third, and fourth ribs 41a to 41d to have the closed hollow structure, so that the load is dispersed over the rib 41 and the peripheral wall of the joint member 25, thereby providing a high degree of rigidity to the connection of the rear extension 6a of the side sill 6, the end of the rear seat cross member 4, and the front end of the rear side member 5 against vertical and lateral impacts produced by a vehicle collision.

For example, when the vertical impact acts on the rear seat cross member 4 from a rear seat or a fuel tank to the rear seat cross member 4, it is transmitted as internal pressure of the rib 41 to the side sill 6. Particularly, the first and second ribs 41a and 41b couple the connection of the joint member 25 and the rear seat cross member 4 and the connection of the joint member 25 and the side sill 6, thereby avoiding deformation of either or both of the connections, resulting in an increase in rigidity against lateral and torsional impacts.

Further, the third rib 41c intersects the fourth rib 41d, thereby increasing the rigidity in the higher-rigidity region AH, especially on the shelf 34. Additionally, the stud bolt 44 for mounting the sub-frame 45 is installed near the intersection of the third and fourth ribs 41c and 41d, so that vertical, lateral, or longitudinal impact transmitted from the sub-frame 45 is received by the shelf 34, thus resulting in desirable transmission or dispersion of the impact over the rear side member 5, the side sill 6, and the rear seat cross member 4 through the whole of the higher-rigidity region AH, thereby minimizing physical excitation of the rear side member 5 to reduce the vibration thereof.

Figure 6:
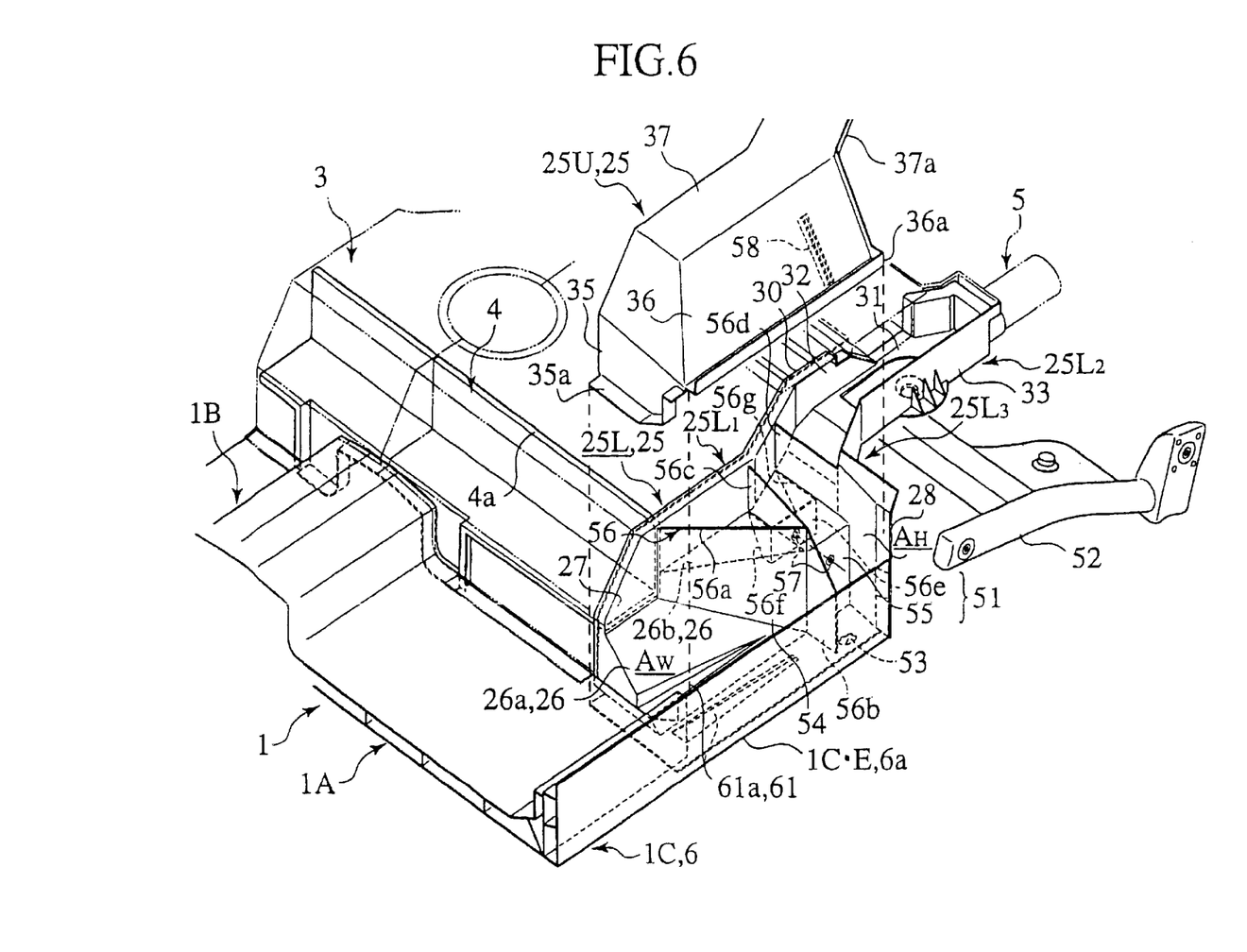
FIG. 6 is a partial perspective and exploded view which shows a floor structure according to the second embodiment of the invention.
Figure 7:
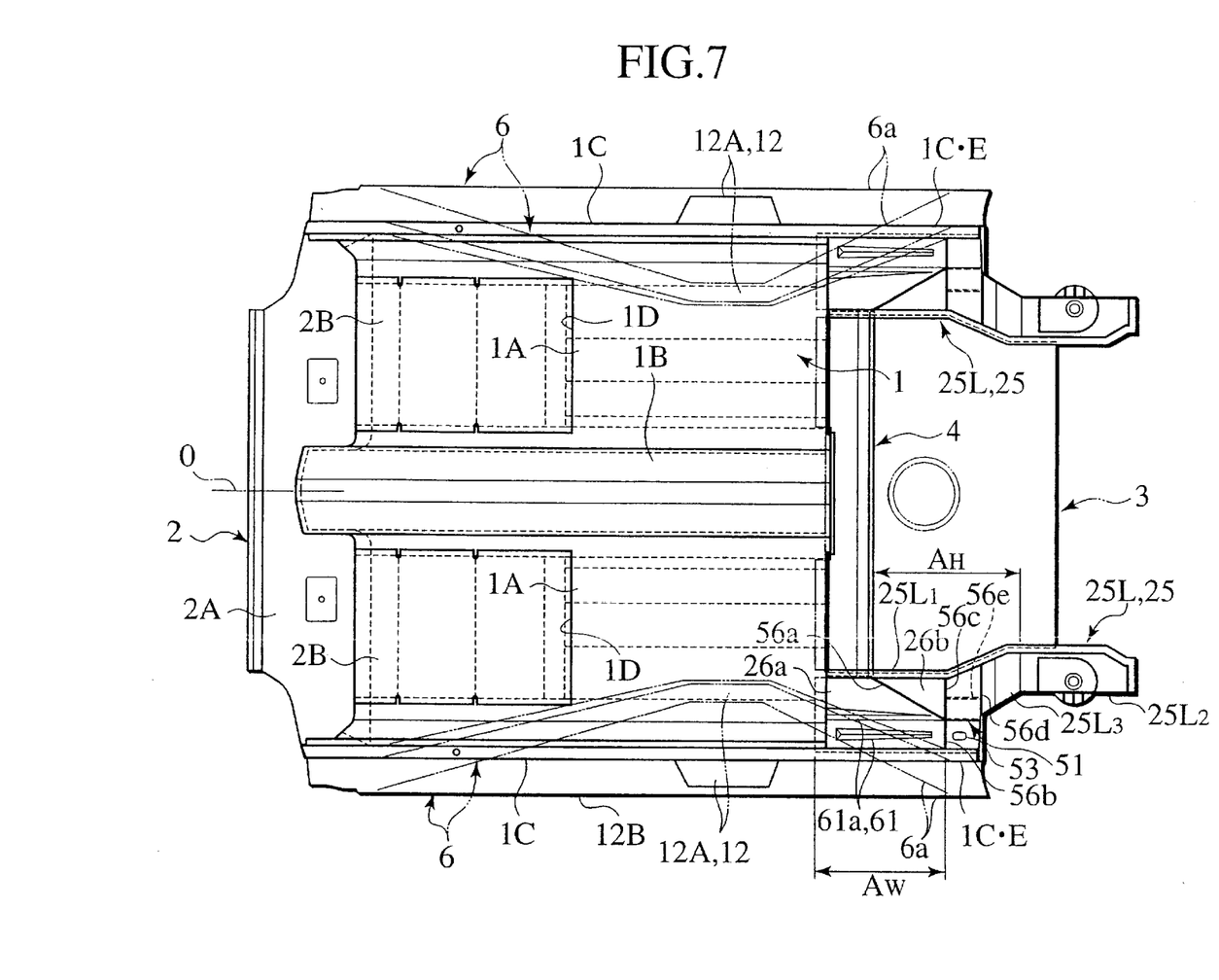
FIG. 7 is a plan view which show a floor structure of the second embodiment.

FIGS. 6 and 7 show the second embodiment of the invention. The same reference numbers as employed in the first embodiment refer to the same parts, and explanation thereof in detail will be omitted here.

A suspension mount 51 is provided in the higher-rigidity region AH of the joint member 25 which supports an end of a rear suspension 52 pivotably. A tie-down hook 53 is installed near the suspension mount 51.

The bottom wall 26 of the member body 25L1 of the lower member 25L consists of two sections: a front bottom wall 26a and a rear bottom wall 26b. The front bottom wall 26a is located in the lower-rigidity region AW, while the rear bottom wall 26b is located in the higher-rigidity region AH and connects at front and side edges thereof with upstanding walls 54 and 55. The rear bottom wall 26b is at a higher level than the front bottom wall 26a.

The upstanding wall 54 extends at substantially the same angle to the longitudinal center line of the vehicle body as that of the rib 41a. An upstanding wall 55 extends in parallel to the rear extension 1C·E of the side sill portion 1C at a given interval away therefrom.

The higher-rigidity region AH is, like the first embodiment, formed by a rib 56 made up of first, second, third, fourth, fifth, sixth, and seventh ribs 56a, 56b, 56c, 56d, 56e, 56f, and 56g. The first rib 56a extends upward from an upper edge of the upstanding wall 54. The second rib 56b extends perpendicular to the rear extension 1C·E and connects at one end thereof with a junction of the upstanding walls 54 and 55 and an outer end of the first rib 56a on the bottom wall 26a and at the other end thereof with an inner surface of the rear extension 1C·E. The third rib 56c extends on the rear bottom wall 26b and connects at one end thereof with the junction of the upstanding walls 54 and 55 and at the other end with the side wall 27 of the member body 25L1 in alignment with the second rib 56b. The fourth rib 56d extends on the rear bottom wall 26b in parallel to the third rib 56c and connects at one end thereof with a junction of the rear wall 28 of the member body 25L1 and the side wall 33 of the arm base 25L3 and at the other end thereof with the side wall 32 opposed to the side wall 33. The fifth rib 56e extends downward from the lower surface of the rear bottom wall 26b at a given interval away from and in parallel to the upstanding wall 55 and has the same width as that of the upstanding wall 55. The sixth rib 56f connects at an outer edge thereof with a front edge of the fifth rib 56e and extends from the lower edge of the third rib 56c in alignment with the third rib 56c. The seventh rib 56g connects at an outer edge thereof with a rear edge of the fifth rib 56e and extends from the lower edge of the fourth rib 56d in alignment with the fourth rib 56d.

The upstanding wall 55 and the fifth rib 56e have rear suspension support holes 57 formed in alignment with the width-wise direction of the vehicle body and serve as a bracket for mounting the rear suspension 52.

As apparent from the above discussion, the upstanding walls 54 and 55 physically function as the part of the rib 56. The upstanding wall 55 also serves as the bracket for mounting the rear suspension 52.

The tie-down hook 53 is installed on a rear extension of the front bottom wall 26a surrounded by the rear extension 1C·E of the side sill portion 1C, the rear wall 28 of the member body 25L1, the upstanding wall 55, and the second rib 56b.

The upper edge of the second rib 56b is inclined downward from the junction of the first and third ribs 56a and 56c to the upper edge of the rear extension 1C·E of the side sill portion 1C. A groove 58 is formed in an inner surface of the side wall 36 of the upper member 25U for engagement with the upper edge of the second rib 56b when the upper member 25U is fitted on the rib 56. Adhesive may be loaded into a junction of the upper edge of the second rib 56b and the groove 58 to further reduce noise levels.

The front bottom wall 26a of the member body 25L1 in the lower-rigidity region AW is inclined from a lower side edge of the rear extension 1C·E of the side sill portion 1C to the joint of the side wall 27 and a lower edge of the end of the rear seat cross member 4 and has a weakening portion 61 designed to facilitate a lateral collapse of the front bottom wall 26a caused by the impact in the width-wise direction of the vehicle body upon occurrence of a side collision of the vehicle.

The weakening portion 61 is provided by double beads 61a which are formed in a portion of the front bottom wall 26a close to the rear extension 1C·E and extend in parallel to the rear extension 1C·E, but may alternatively be provided by slits.

In the second embodiment, the lower-rigidity region AW facing the end of the rear seat cross member 4 is, as described above, provided by defining the higher-rigidity region AH in the inside of the joint member 25 offset from the end of the rear seat cross member 4 in the longitudinal direction of the vehicle body so that a side area thereof may be increased outward of the vehicle. Thus, the rigidity of the joint of the side sill 6 and the rear side member 5 is, like the first embodiment, increased, thereby achieving the ideal deformation mode as described in the first embodiment.

Particularly, the front bottom wall 26a of the member body 25L1 in the lower-rigidity region AW, as described above, has formed therein the beads 61a to form the weakening portion 61 to facilitate the lateral collapse of the front bottom wall 26a subjected to the lateral impact upon occurrence of a side collision of the vehicle, thereby also facilitating the ease of lateral collapse of the joint member 25 into the lower-rigidity region AW.

The suspension mount 51 is provided in a higher-rigidity portion of the rib 56 in the higher-rigidity region on which the first to seventh ribs 56a to 56g are concentrated, so that the vertical, lateral, or longitudinal impact transmitted from the rear suspension 52 is received by the higher-rigidity portion of the rib 56 and transmitted to the rear side member 5, the side sill 6, and the rear seat cross member 4 through the whole of the higher-rigidity region AH, thereby minimizing physical vibrations thereof. Further, the second rib 56b is joined to the upper member 25U through the groove 58, thus facilitating desirable transmission of the impact to the upper member 25U.

The tie-down hook 53 is installed adjacent the suspension mount 51, thus resulting in an increase in rigidity of the tie-down hook 53.

Figure 8:
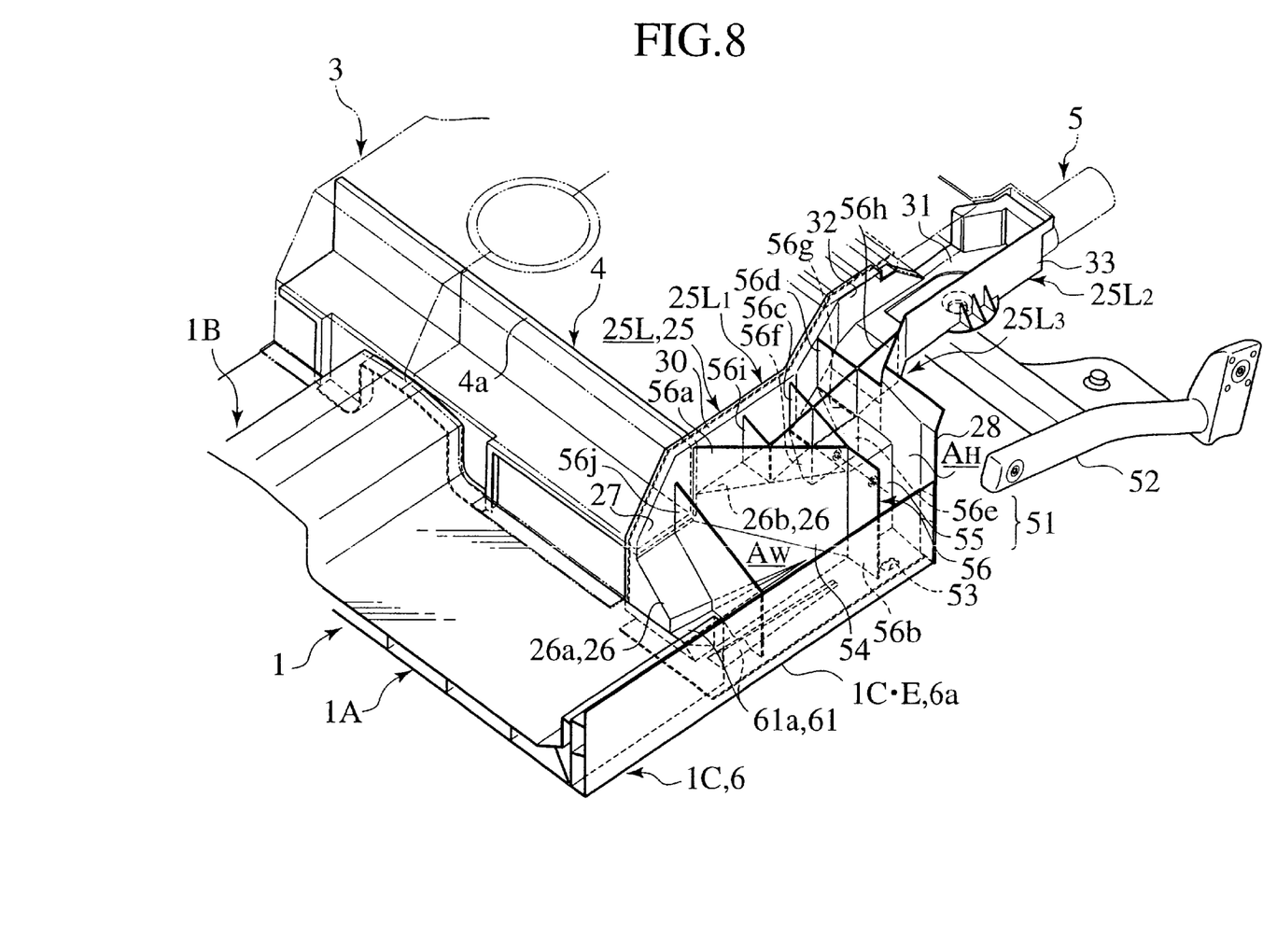
FIG. 8 is a partial perspective view which shows a floor structure according to the third embodiment of the invention.

FIG. 8 shows the third embodiment of the invention in which the rib 56 is concentrated on a rear section of the higher-rigidity region AH as compared with the second embodiment.

The rib 56 is made up of first, second, third, fourth, fifth, sixth, seventh, eighth, and ninth ribs 56a, 56b, 56c, 56d, 56e, 56f, 56g, 56h, and 56i. The eighth rib 56h is disposed on the rear bottom wall 26b of the member body 25L1 of the lower member 25L and extends from a middle portion of the first rib 56a to a middle portion of the side wall 33 of the arm base 25L3 in vertical alignment with the firth rib 56e perpendicular to the third and fourth ribs 56c and 56d. The ninth rib 56i extends from a junction of the front end of the eighth rib 56h and the first rib 56a to the side wall 27 of the member body 25L1 in parallel to the third and fourth ribs 56c and 56d. This increases the rigidity of the rear section of the higher-rigidity region AH, that is, the connection of the side sill 6 and the rear side member 5 as compared with the second embodiment.

For adjusting a balance in rigidity between the lower-rigidity region AW and the higher-rigidity region AH, an upstanding rib 56j may be installed in the lower-rigidity region AW which extends laterally of the vehicle body from a central portion of the end of the rear seat cross member 4 to the rear extension 1C·E of the side sill portion 1C.

Figure 9:
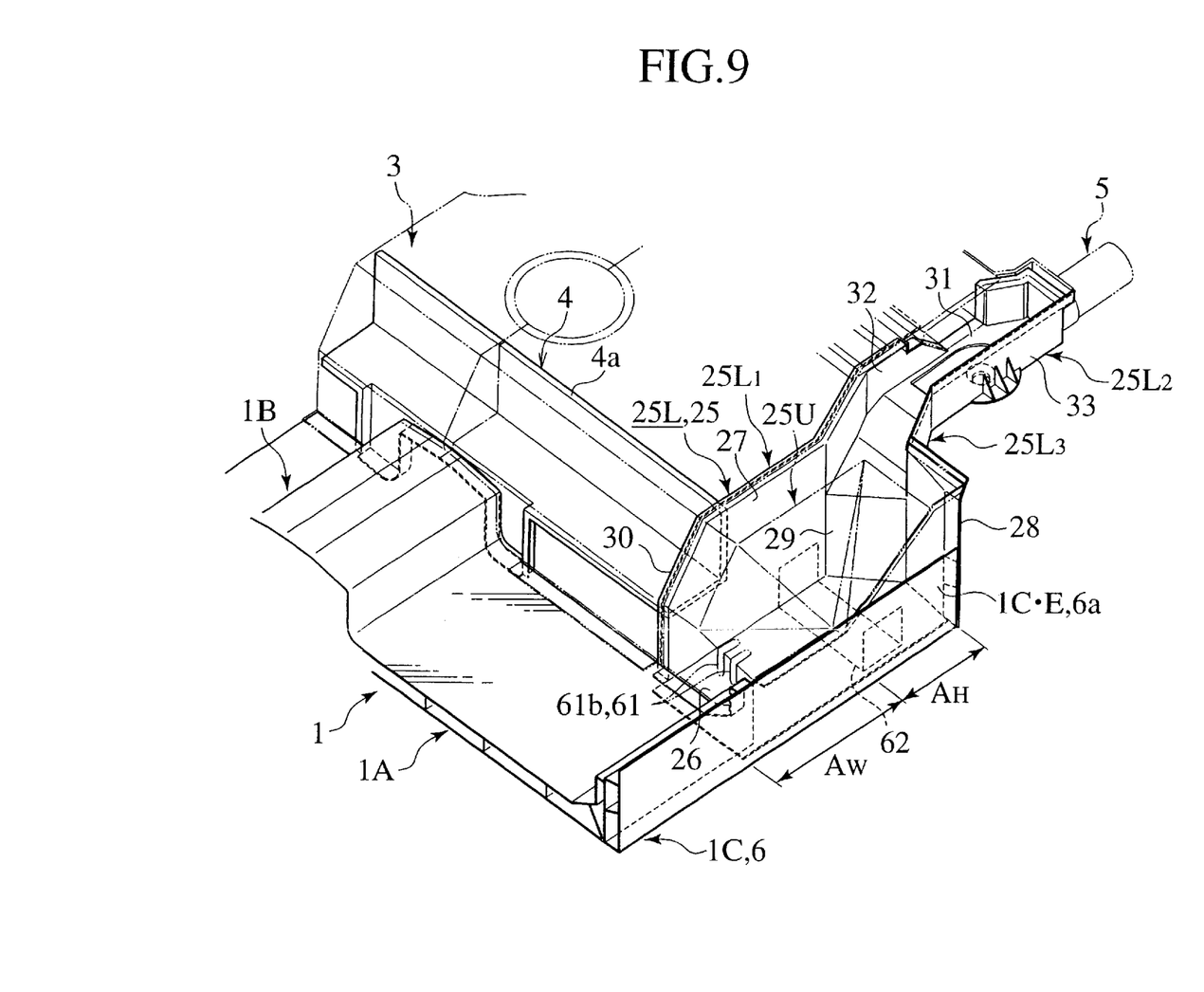
FIG. 9 is a partial perspective view which shows a floor structure according to the fourth embodiment of the invention.

FIG. 9 shows the fourth embodiment of the invention which is different from the above embodiments only in that the higher-rigidity region AH and the lower-rigidity region $A_W$ of the joint member 25 are provided by changing the thickness of the joint member 25. Other arrangements are identical, and explanation thereof in detail will be omitted here.

Specifically, a reinforcement plate 62 is joined on the bottom wall 26 of the member body 25L1 of the lower member 25L to increase the thickness of the joint member 25 partially, thereby increasing the rigidity of a rear portion of the joint member 25 to define the higher-rigidity region AH.

The weakening portion 61 in the lower-rigidity region AW is formed by machining a plurality of slits 61b in a front portion of the upper member 25U perpendicular to a front ridge of the upper member 25U, thereby facilitating the ease of a lateral collapse of the lower-rigidity region AW upon occurrence of a side collision of the vehicle.

Figure 10:
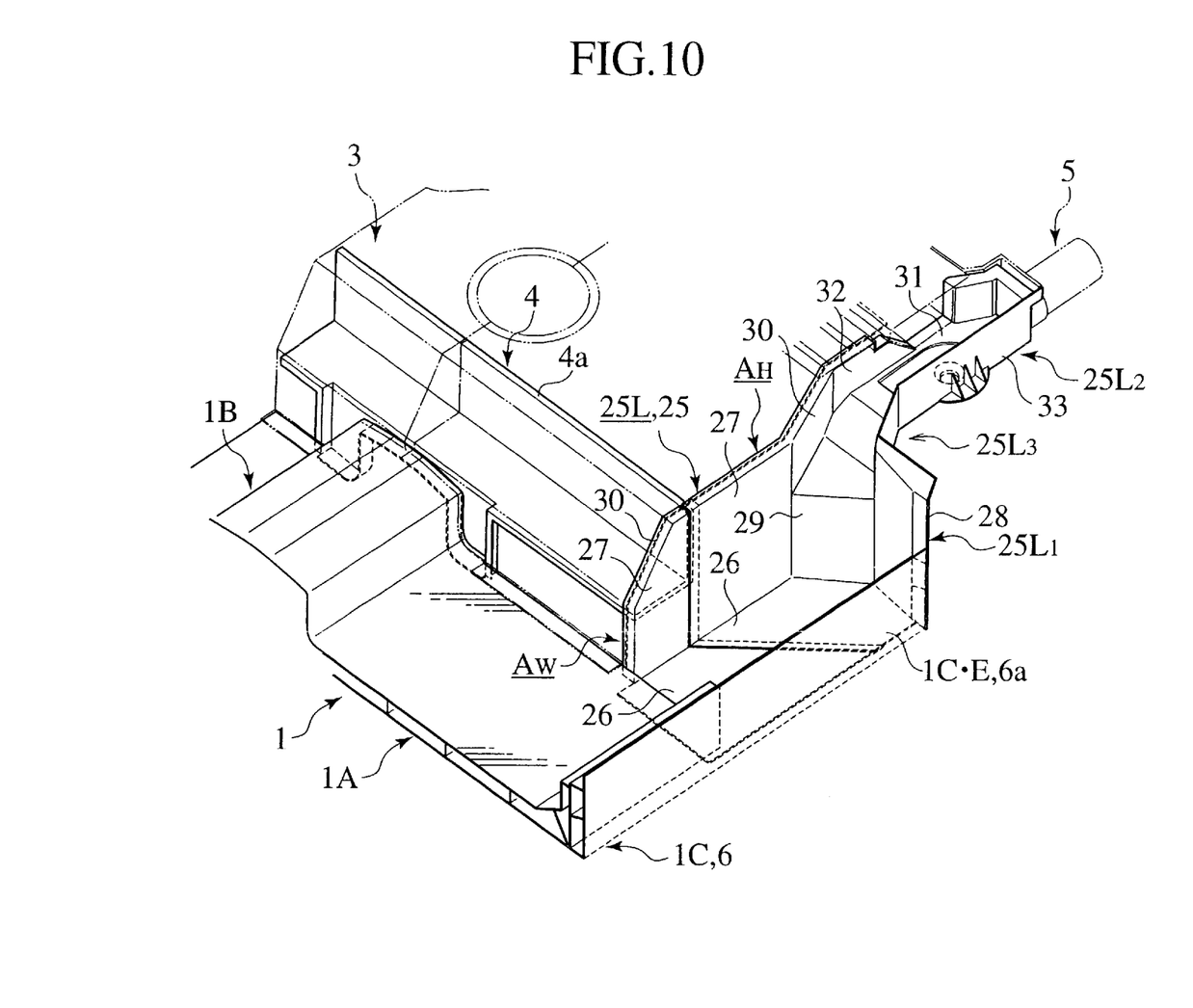
FIG. 10 is a partial perspective view which shows a floor structure according to the fifth embodiment of the invention.

FIG. 10 shows the fifth embodiment of the invention in which the higher-rigidity region $A_H$ and the lower-rigidity region $A_W$ of the joint member 25 are, like the fourth embodiment, provided by changing the thickness of the joint member 25.

Specifically, the lower member 25L is made up of two parts: a front half and a rear half which are bonded or welded together. The front half is formed by a portion of the lower member 25L ranging from the middle of the member body 25L1 to the arm 25L3 and has the thickness smaller than that of the remaining portion of the lower member 25L to define the lower-rigidity region $A_W$.

The higher-rigidity region AH and the lower-rigidity region AH may alternatively be formed by making the front half and the rear half of the lower member 25L of materials having different hardnesses without changing the thickness thereof. For example, the front half of the lower member 25L is cast in a lightweight metal such as an aluminum alloy, while the rear half is cast in material having a higher hardness or made by pressing a metal plate having a higher hardness to define the higher-rigidity region AH.

Figure 11:
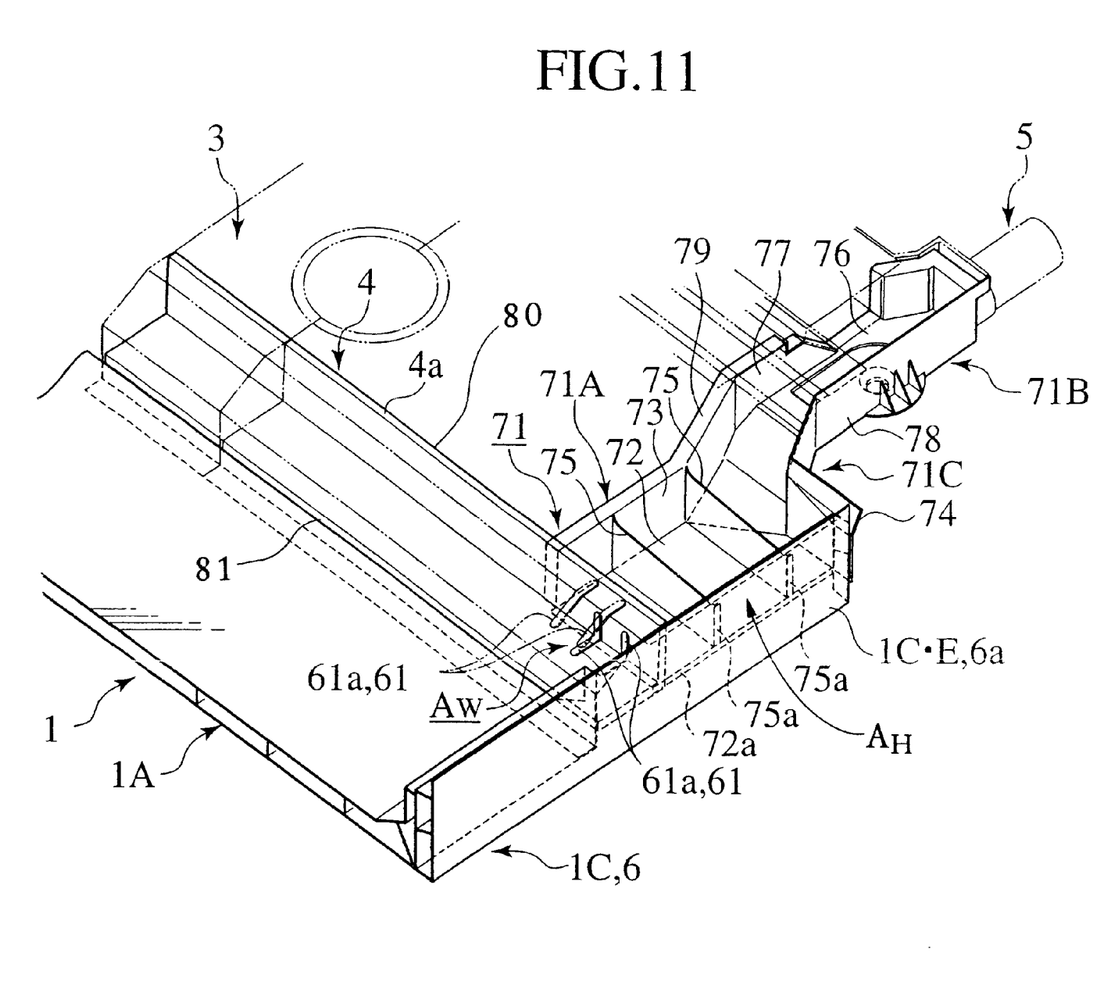
FIG. 11 is a partial perspective view which shows a floor structure according to the sixth embodiment of the invention.

FIG. 11 shows the sixth embodiment of the invention in which each end of the rear seat cross member 4 is joined to the side wall of the side sill portion 1C directly using the flange 4a.

The rear seat cross member 4, the rear extension 1C·E of the side sill portion 1C, and the rear side member 5 are joined through a joint member 71. The joint member 71 is, like the joint member 25 in the first to third embodiments, made of a lightweight metal such as an aluminum alloy.

The joint member 71 includes a body 71A, an arm 71B, and an arm base 71C. The body 71A is secured to a corner portion defined by an end portion of the rear wall of the rear seat cross member 4 and the side wall of the rear extension 1C·E of the side sill portion 1C. The arm 71B is offset in a longitudinal center line thereof inside the vehicle body from the body 71A and extends substantially in alignment with the rear side member 5. The arm 71B is connected to the front end of the rear side member 5. The arm base 71C has a longitudinal center line thereof biased outwardly and connects between the arm 71B and the body 71A.

The body 71A includes a bottom wall 72, a side wall 73, and a rear wall 74 and defines a box-like shape along with the rear wall of the rear seat cross member 4 and the rear extension 1C·E. The body 71A also includes upstanding ribs 75 which extend on the bottom wall 72 from the side wall 73 to the side wall of the rear extension 1C·E in the width-wise direction of the vehicle body.

The arm 71B and the arm base 71C have a common bottom wall 76, a common inner side wall 77, and a common outer side wall 78. The bottom wall 76 has a front portion inclined downward from the arm base 71C to the bottom wall 72 of the body 71A. The inner side wall 77 continues the side wall 73 of the body 71A. The outer side wall 78 continues the rear wall 74 of the body 71A.

The bottom wall 72 of the body 71A is joined to a lower surface of the rear end of the rear seat cross member 4 and the side wall of the rear extension 1C·E through a flange 72a. The rear wall 74 is joined to the rear end of the rear extension 1C·E. Each of the upstanding ribs 75 has a flange 75a formed on an outer end thereof and is joined to the side wall of the rear extension 1C·E through the flange 75a.

The body 71A and the arm 71B have a common flange 79 formed on ends thereof. The flange 79 extends from the front end of the body 71A to the upper ends of the body 71A and the side wall 77 and connects at a front portion thereof to the rear wall of the rear seat cross member 4 and at an upper portion thereof to the rear floor 3.

The rear floor 3 covers the whole of a connection of the rear seat cross member 4, the side sill portion 1C, and the joint member 71 to define closed chambers together with the joint member 71 and the rear seat cross member 4.

The lower-rigidity region $A_W$ is provided in an end portion of the rear seat cross member 4 joined to the side sill portion IC. The lower-rigidity region $A_W$ is defined by providing the weakening portion 61 which facilitates the ease of a lateral collapse of the body upon occurrence of a side collision of the vehicle. A region $A_H$ adjacent the lower-rigidity region $A_W$ denotes a relatively higher-rigidity region $A_H$. The weakening portion 61 is made by forming a plurality of beads 61a in an outside portion of the rear seat cross member 4 perpendicular to a ridge 80 thereof and in an outside portion of the rear floor 3 perpendicular to a front ridge 81 thereof. Instead of the beads 61a, slits may be formed.

The weakening portion 61 may be formed only in the rear seat cross member 4.

With the above arrangements, the rear extension 6a of the side sill 6, the rear seat cross member 4, and the rear side member 5 are fixed by the joint member 71 so as to have the closed hollow structure ensuring the rigidity usually required by the floor of the vehicle body. The lower-rigidity region AW provided in the end of the rear seat cross member 4 serves to facilitate the inward buckling of the rear seat cross member 4 when the vehicle is involved in a side collision, thereby establishing the ideal deformation mode, as described above.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A vehicle floor comprising:
    a front floor formed in extrusion, said front floor being so oriented that a direction of the extrusion is parallel to a longitudinal direction of a vehicle;
    a rear floor joined to a rear end of said front floor;
    side sills disposed on sides of said front floor, each of said side sills extending in the longitudinal direction of the vehicle and having an extension projecting backward from said front floor;
    a rear seat cross member having a length extending in a width-wise direction of the vehicle, said rear seat cross member being disposed on a connection of said rear floor to said front floor extending in the width-wise direction of the vehicle;
    rear side members disposed on sides of said rear floor, extending in the longitudinal direction of the vehicle;
    pillars secured on said side sills above said rear seat cross member; and
    joint members each of which has a closed hollow structure and joins the extension of one of said side sills, an end of said rear seat cross member, and a front end of one of said rear side members, each of said joint members being installed between said end of said rear seat cross member and a respective one of said side sills and forming a lower-rigidity region adjacent the end of said rear seat cross member in the width-wise direction of the vehicle.

2. A vehicle floor as set forth in claim 1, wherein formation of the lower-rigidity region is achieved by defining a higher-rigidity region in a portion of each of said joint member offset from said end of said rear seat cross member.

3. A vehicle floor as set forth in claim 2, wherein the higher-rigidity region is formed by installing a plurality of upstanding ribs within each of said joint members.

4. A vehicle floor as set forth in claim 3, wherein the upstanding ribs are so arranged as to define a plurality of closed chambers in the higher-rigidity region of each of said joint members.

5. A vehicle floor as set forth in claim 3, wherein the upstanding ribs are disposed backward from a connection of each of said joint members and said end of said rear seat cross member, a frontmost one of said upstanding ribs connecting at one end with an inner side wall of said joint member secured to the end of said rear seat cross member and at the other end with a rear end of the extension of a corresponding side sill which is offset backward from a joint of the one end of said frontmost one of said upstanding ribs and the inner side wall of said joint member.

6. A vehicle floor as set forth in claim 5, wherein the upstanding ribs are concentrated on a rear side of the higher-rigidity region as compared with a front side of the higher-rigidity region.

7. A vehicle floor as set forth in claim 2, wherein the higher-rigidity region and the lower-rigidity region are defined by establishing a difference in wall thickness of each of said joint members.

8. A vehicle floor as set forth in claim 7, wherein a reinforcement plate is joined to each of said joint members to establish the difference in wall thickness, thereby defining the higher-rigidity region.

9. A vehicle floor as set forth in claim 2, wherein the higher-rigidity region and the lower-rigidity region are defined by making two portions of said joint members of different materials.

10. A vehicle floor as set forth in claim 2, wherein a suspension mount is provided in the higher-rigidity region.

11. A vehicle floor as set forth in claim 2, wherein a sub-frame mount is provided in the higher-rigidity region.

12. A vehicle floor as set forth in claim 2, wherein a tie-down hook is provided in the higher-rigidity region.

13. A vehicle floor as set forth in claim 1, further comprising a weakening portion provided in the lower-rigidity region for facilitating a collapse of the lower-rigidity region upon input of a lateral impact when the vehicle is involved in a side collision.

14. A vehicle floor as set forth in claim 13, wherein the weakening portion is defined by forming a slit in the lower-rigidity region.

15. A vehicle floor as set forth in claim 13, wherein the weakening portion is defined by forming a bead in the lower-rigidity region.

16. A vehicle floor comprising:
    a front floor formed in extrusion, said front floor being so oriented that a direction of the extrusion is parallel to a longitudinal direction of a vehicle;
    a rear floor joined to a rear end of said front floor;
    side sills disposed on sides of said front floor, each of said side sills extending in the longitudinal direction of the vehicle and having an extension projecting backward from said front floor;
    rear side members longitudinally disposed adjacent a rear portion of said rear floor;

a rear seat cross member having a length extending in a width-wise direction of the vehicle, said rear seat cross member being disposed on a connection of said rear floor to said front floor extending in the width-wise direction of the vehicle and connecting at ends thereof directly with said side sills, respectively;

pillars secured on said side sills above said rear seat cross member;

joint members each of which has a closed hollow structure and joins the extension of one of said side sills, one of said ends of said rear seat cross member, and a front end of a respective rear side member, each of said joint members being installed on a corner portion defined by a rear wall of a respective one of said ends of rear seat cross member and the extension of said side sill; and a lower-rigidity region formed in each of end portions of said rear seat cross member.

17. A vehicle floor as set forth in claim 16, wherein the lower-rigidity region is provided by forming a weakening portion serving to facilitate a collapse of the lower-rigidity region upon input of a lateral impact when the vehicle is involved in a side collision.

18. A vehicle floor as set forth in claim 17, wherein the weakening portion is defined by forming a slit.

19. A vehicle floor as set forth in claim 17, wherein the weakening portion is defined by forming a bead.

20. A vehicle floor comprising:

a front floor member formed in extrusion, said front floor member being so oriented that a direction of the extrusion is parallel to a longitudinal direction of a vehicle;

a rear floor member joined to a rear end of said front floor member;

side sill members disposed on respective sides of said front floor member, said side sill members each extending in the longitudinal direction of the vehicle and having an extension projecting backward from said front floor member;

a rear seat cross member having a length extending in a width-wise direction of the vehicle, said rear seat cross member being disposed on a connection of said rear floor member to said front floor member which extends in the width-wise direction of the vehicle;

rear side members disposed on respective sides of said rear floor member, each of said rear side members extending in the longitudinal direction of the vehicle;

a pillar member secured on each of said side sill members above said rear seat cross member; and jointing means for joining the extension of said side sill members, an end of said rear seat cross member, and a front end of said rear side member, said jointing means having a closed hollow structure, being installed between said end of said rear seat cross member and said side sill members, and for forming a lower-rigidity region adjacent said end of said rear seat cross member in the width-wise direction of the vehicle.

21. A vehicle floor comprising:

a front floor member formed in extrusion, said front floor member being so oriented that a direction of the extrusion is parallel to a longitudinal direction of a vehicle;

a rear floor member joined to a rear end of said front floor member;

side sill members disposed on respective sides of said front floor member, said side sill members each extending in the longitudinal direction of the vehicle and having an extension projecting backward from said front floor member;

a rear seat cross member having a length extending in a width-wise direction of the vehicle, said rear seat cross member being disposed on a connection of said rear floor member to said front floor member which extends in the width-wise direction of the vehicle and connecting at ends thereof directly with said side sill, respectively;

a pillar member secured on each of said side sill members above said rear seat cross member;

jointing means for joining the extension of one of said side sill members, an end of said rear seat cross member, and a front end of rear side member, said jointing means having a closed hollow structure and being installed on a corner portion defined by a rear wall of said end of said rear seat cross member and the extension of said side sill members; and a lower-rigidity region formed in end portions of said rear seat cross member.

22. A vehicle floor comprising:

a front floor formed in extrusion, said front floor being so oriented that a direction of the extrusion is parallel to a longitudinal direction of a vehicle;

a rear floor joined to a rear end of said front floor;

side sills disposed on sides of said front floor, each of said side sills extending in the longitudinal direction of the vehicle and having an extension projecting backward from said front floor;

a rear seat cross member having a length extending in a width-wise direction of the vehicle, said rear seat cross member being disposed on a connection of said rear floor to said front floor extending in the width-wise direction of the vehicle;

rear side members disposed on sides of said rear floor, extending in the longitudinal direction of the vehicle;

pillars secured on said side sills above said rear seat cross member; and joint members each of which has a closed hollow structure joining the extension of one of said side sills, an end of said rear seat cross member, and a front end of one of said rear side members, and being installed between said end of said rear seat cross member and said one of said side sills and defining a lower-rigidity region which reduces lateral direction rigidity formed adjacent said end of said rear seat cross member in the width-wise direction of the vehicle.

23. A vehicle floor comprising:

a front floor formed in extrusion, said front floor being so oriented that a direction of the extrusion is parallel to a longitudinal direction of a vehicle;

a rear floor joined to a rear end of said front floor;

side sills disposed on sides of said front floor, each of said side sills extending in the longitudinal direction of the vehicle and having an extension projecting backward from said front floor;

a rear seat cross member having a length extending in a width-wise direction of the vehicle, said rear seat cross member being disposed on a connection of said rear floor to said front floor extending in the width-wise direction of the vehicle and connecting at ends thereof directly with said side sills, respectively;

pillars secured on said side sills above said rear seat cross member;

rear side members disposed on sides of said rear floor, extending in the longitudinal direction of the vehicle;

joint members, each of which has a closed hollow structure joining the extension of one of said side sills, one of said ends said rear seat cross member, and a front end of one of said rear side members, and being installed on a corner portion defined by a rear wall of said one end of said rear seat cross member and said extension of said side sill; and a lower-rigidity region which reduces lateral direction rigidity formed in each of end portions of said rear seat cross member.

24. A vehicle floor comprising:

a front floor member formed in extrusion, said front floor member being so oriented that a direction of the extrusion is parallel to a longitudinal direction of a vehicle;

a rear floor member joined to a rear end of said front floor member;

side sill members disposed on respective sides of said front floor member, said side sill members each extending in the longitudinal direction of the vehicle and having an extension projecting backward from said front floor member;

a rear seat cross member having a length extending in a width-wise direction of the vehicle, said rear seat cross member being disposed on a connection of said rear floor member to said front floor member which extends in the width-wise direction of the vehicle;

rear side members disposed on respective sides of said rear floor member, each of said rear side members extending in the longitudinal direction of the vehicle;

a pillar member secured on each of said side sill members above said rear seat cross member; and a joint joining the extension of said side sill members, one end of said rear seat cross member, and a front end of said rear side member, said joint having a closed hollow structure, being installed between said one end of said rear seat cross member and said side sill members, and having a lower-rigidity region which reduces lateral direction rigidity formed adjacent said one end of said rear seat cross member in the width-wise direction of the vehicle.

* * * * *